United States Patent [19]

Richards et al.

[11] Patent Number: 4,838,673

[45] Date of Patent: Jun. 13, 1989

[54] POLARIZED LENS AND METHOD OF MAKING THE SAME

[75] Inventors: Charles Richards, Lahaina, Hi.; Kazuhiro Kobayashi, Sabae, Japan

[73] Assignee: J. R. Richards, Inc., Lahaina, Hi.

[21] Appl. No.: 42,821

[22] Filed: Apr. 27, 1987

[51] Int. Cl.[4] .................... G02C 7/10; G02C 7/14; B24B 19/00
[52] U.S. Cl. ......................... 351/44; 351/49; 51/248
[58] Field of Search .............. 351/44, 45, 47, 48, 351/49, 165; 65/37, 38, 60.1, 60.2; 427/166, 250; 2/432, 433; 51/248; 350/397; 134/111

[56] References Cited

U.S. PATENT DOCUMENTS

| | | |
|---|---|---|
| Re. 27,473 | 9/1972 | Mauer . |
| 2,168,220 | 8/1939 | Land .................................. 350/397 |
| 2,409,356 | 10/1946 | Hutchings . |
| 2,516,720 | 6/1970 | Mauer . |
| 2,675,740 | 4/1954 | Barkley . |
| 3,050,422 | 8/1962 | Zak .................................. 134/111 X |
| 3,560,076 | 2/1971 | Ceppi . |
| 3,617,114 | 11/1971 | Rogers . |
| 4,045,125 | 8/1977 | Farges ................................ 351/44 |
| 4,070,097 | 1/1978 | Gelber . |
| 4,160,584 | 7/1979 | Giles .................................. 351/49 |
| 4,311,368 | 1/1982 | Saito . |
| 4,452,516 | 6/1984 | Munoz . |

Primary Examiner—Rodney B. Bovernick
Attorney, Agent, or Firm—James Creighton Wray

[57] ABSTRACT

A sunglass lens has two mounds of ground mineral glass laminated together with a polarization film to form a single lens having inner and outer surfaces. The inner surface is provided with an anti-reflectant coating and the outer surface is provided with a bigradient coating. A process for making the lens is also disclosed in which bigradient material is vaporized in a vacuum coating machine.

20 Claims, 2 Drawing Sheets

POLARIZED LENS AND METHOD OF MAKING THE SAME

BACKGROUND OF THE INVENTION

The present invention relates to the science of optics which is the study of the nature and behavior of light. More specifically, the present invention relates to protective lenses called "sun glasses" for shielding the eyes from the sun.

In the past, it has generally been known to "polarize" lenses in order to reduce glare on reflected light. This is done by means of double refraction wherein light is split into two beams.

Typically, sun light is regarded as unpolarized and various dichroic polarizing materials have been used in the past.

Bigradient coatings have been used but not in combination with polarization films because the heat necessary for applying bigradient coatings destroys polarization films.

U.S. Pat. No. 2,409,356 describes a coating for lenses applied as a film on upper and lower portions of the lenses by a high vacuum thermal evaporation process. The problem with this process is that polarization films cannot also be applied to the lenses because of the high temperature requirements necessary to deposit the bigradient material.

U.S. Pat. No. 2,675,740 describes another lens using a high vacuum thermal evaporation process, but the coating is of uniform thickness and different reflective properties are achieved by subjecting the lens to electric glow discharge oxidation.

SUMMARY OF THE INVENTION

The present invention solves the problem of making a lens with both a polarization film and a bigradient coating. The invention is manifest in a lens and in a method or process for making the lens.

The lens preferably has two mounds of fine quality mineral glass which are ground and polished on both sides to a perfect six-faceted curve and laminated together with a polarization film to form a single lens. The lens is preferably coated on its inner surface with an anti-reflectant by a vacuum process. The outer surface has a bigradient or double gradient coating adhered thereto.

In order to apply the double gradient coating, the lenses are first cut for a precision fit. Next, the precut polarized glass lenses are passed through a series of eight different tubs in supersonic wave cleaning machines to get rid of any impurities. After complete cleaning, the lenses are positioned in a dome apparatus which is used to implement the vacuum coating process.

The geometry of the dome is designed to ensure proper placement of the bigradient line and axis of polarization for both the right and left lens.

The preferred bigradient materials include metal oxide chrome and $SiO_2$, which are vaporized for approximately thirty minutes in the coating machine where conditions are tightly controlled. Interior pressure is kept at $6 \times 10^{-3}$ PA and the lenses are not normally exposed to heat greater than 50 degrees C. Since the polarization film is very sensitive to heat, the low temperature is necessary to prevent damage to the film.

The coating material is first placed inside a vacuum vaporization dome. Next, an electric current is applied to the dome in order to heat the coating material to the point of vaporization.

The dome apparatus is provided with an inner dome which supports six lenses which constitute three pairs. Each pair is set on the inner dome at right angles to six lines in the dome in order to match the axis of polarization for each pair.

Vaporized chemicals move upwardly from the vaporization source towards the inner part of the dome. A protective shield is disposed at the bigradient line to block the vaporized chemicals and leave the line without coating material, thereby resulting in a split mirror.

DETAILED DESCRIPTION OF THE DRAWINGS

Figure 1:
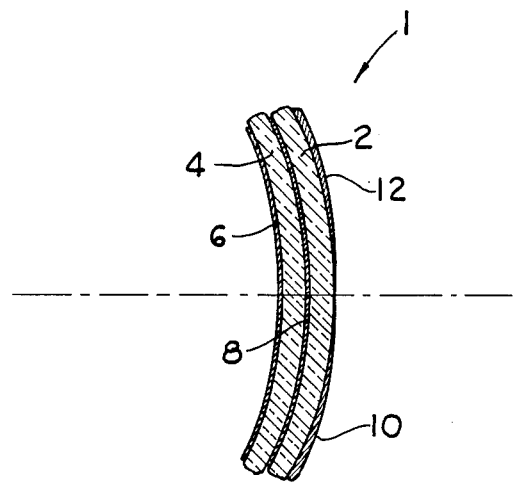
FIG. 1 is a detailed cross sectional view of a lens embodying the present invention.
Figure 2:
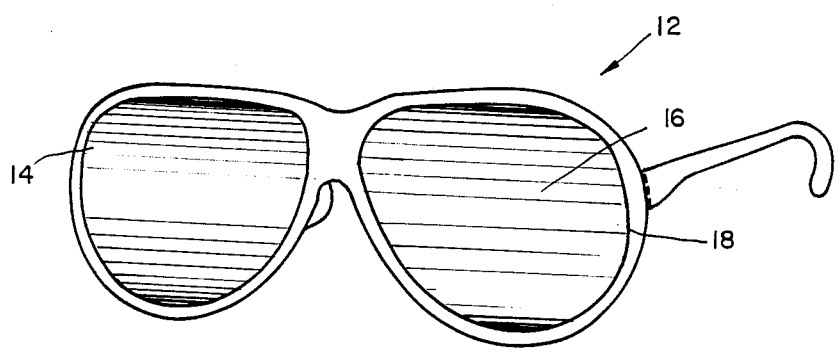
FIG. 2 is a perspective view of glasses employing a pair of the claimed lenses.

Referring to FIGS. 1 and 2, a lens is generally referred to by the numeral 1. The lens 1 has two mounds or layers 2, 4 which are made of the finest mineral glass and which is ground and polished on both sides to form a perfect six-faceted curve. The two mounds 2, 4 are laminated together with a polarization film 8 in between the two mounds. An anti-reflectant coating 6 helps eliminate glare and is vacuum processed on the inside of the lens (referring to the concave surface) and a bigradient or double gradient coating 10, 12 is applied to the outside of the lens (referring to the convex surface).

As shown in FIG. 2, a pair of sunglasses 12 is shown to have an upper coated area 14, a horizontal bigradient line 16 and a lower bigradient coated area 18. At the bigradient line 16, there is virtually no bigradient coating material. This is illustrated in FIG. 1.

Part of the uniqueness of the lens is due to the process used in making the lens. Bigradient coatings, which produce a mirrored or mirror-like surface, normally require heat which tends to destroy a polarization film. However, part of this invention is the method of manufacturing the lens, which enables the application of both a bigradient or double gradient coating and a polarization film.

The process involves first preparing the mounds of mineral glass which are ground and polished on both sides. Then the polarization film is used to laminate the two mounds together to form a single lens.

The lenses are precut to the desired shape and then passed through an ultrasonic wave cleaning process which uses an ultrasonic wave cleaning machine to get rid of any dirt on the lenses. Preferably, the cleaning process involves sequentially passing the lenses through eight different tubs. Tub 1 contains a synthetic cleaning fluid and is kept at approximately 50 degrees C. The preferred synthetic fluid is ALCONOX, which is manufactured in New York. Tub 2 contains the same synthetic fluid and is also kept at approximately 50 degrees C. Tub 3 contains regular water or tap water which is kept at approximately 19 degrees C. Tub 4 contains distilled water and is also kept at approximately 19 degrees C. Tub 5 contains isopropyl alcohol which is kept at approximately 15 degrees C. Tubs 6 and 7 contain isopropyl alcohol and are also kept at 15 degrees C. Finally, tub 8 contains flon.

Figure 3:
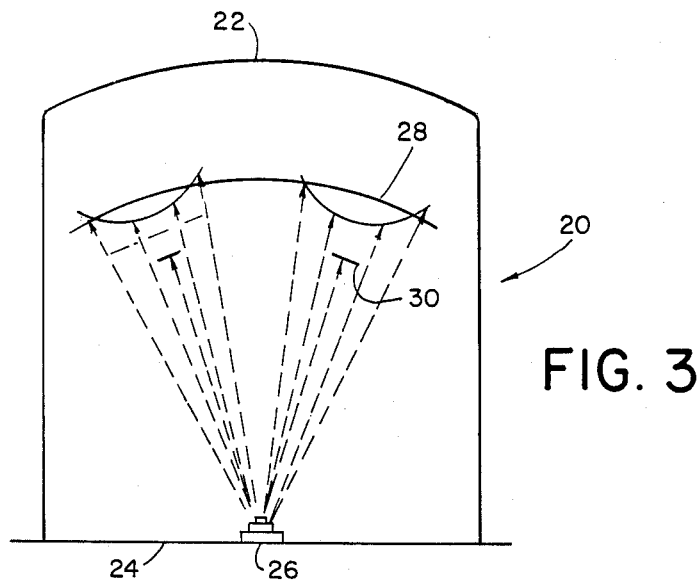
FIG. 3 is a schematic representation of the lens coating apparatus.
Figure 4:
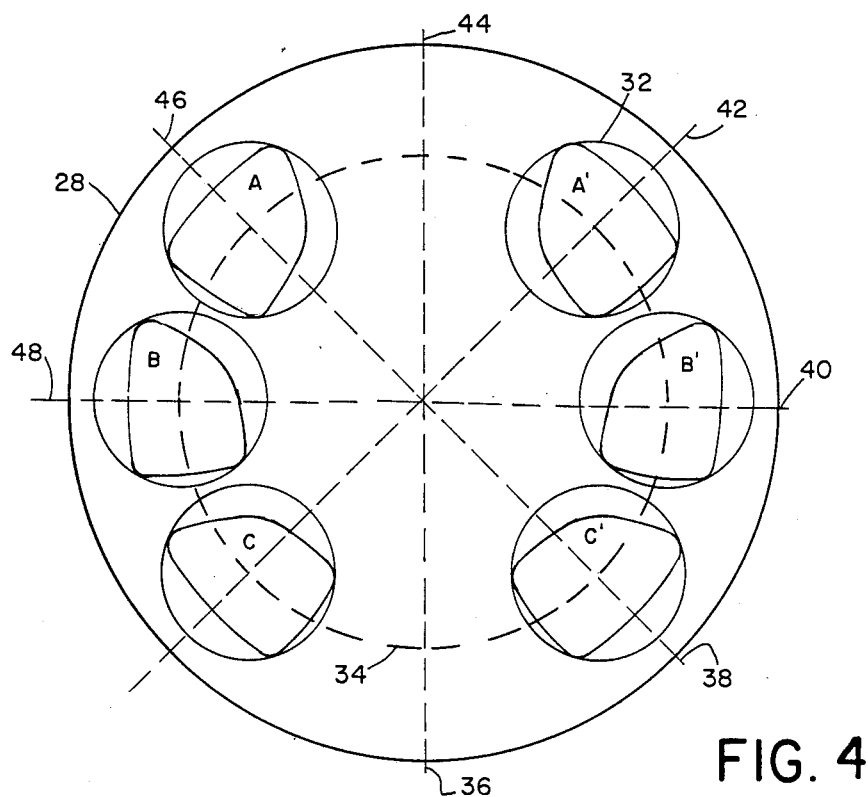
FIG. 4 is a plan view of the inner dome of the lens coating apparatus.

After thorough cleaning, the lenses are passed to a dome which is illustrated in FIGS. 3 and 4. The dome is generally referred to by the numeral 20 and refers to a vacuum coating machine. The dome 20 or vacuum coating machine has an outer dome 22, a bottom 24, a vaporization source 26 and an inner dome 28. These elements are represented schematically since the general concept of a vacuum coating machine is known to those with ordinary skill in the art.

The inner dome 28 is unique in that it provides means for aligning left and right lenses to match axes of polarization. This is essential in providing the user with an equal amount of glare reduction for left and right eyes. An imbalance could lead to eye strain.

The inner dome 28 is configured to align left and right lenses which are shown as three pairs in FIG. 4. The three pairs are A-A', B-B', and C-C'. Each lens is fitted into a recess 32 and each recess 32 is arranged in specific space relationships to each other. Each lens can be held in each recess by any conventional means.

Each pair of lenses is aligned by using six lines in the dome. Referring to FIG. 4, line 34 represents the horizontal axis of each lens and corresponds to the bigradient line 18 shown in FIG. 2. The line is for reference purposes only and does not constitute a visible element or structural component of the lens. Because the lenses are not flat, the horizontal axis appears linear when viewed from above or below. Reference lines 36, 38, 40, 42, 44, 46, 48 and 50 are equidistantly spaced and are 45 degrees apart. Lines 38, 40, 42, 46, 48 and 50 are intended to be at right angles to the horizontal axis 34 of each line. In this way, the lenses can be properly aligned and the placement of the bigradient line and axis of polarization is automatically produced equally for right and left lenses in the vacuum coating machine. The six lines are intended to be visible and are used to align the lenses by crossing each line with the horizontal axis of the lens. When a right angle is formed, the lenses are properly aligned.

After placing the lenses in the machine and aligning the lenses, a bigradient coating material is vaporized with the vaporization source 26 to coat the lens. The specified material is placed inside the dome 20 and the interior of the dome is placed in vacuum conditions of less than $6 \times 10^{-3}$ PA. After vacuuming the interior of the dome, the vaporization source is heated in order to vaporize the specified materials. Normally, the heat required for vaporization would destroy the polarization film which has been laminated between the two mounds of glass for each lens. However, in the present invention, there is no change in the quality of the polarization film because the inner part of the dome in which the lenses are set is kept at a temperature of less than 50 degrees C.

The vaporized chemicals gather upward to the inner part of the dome and will thereupon be adhered to the lenses. In order to make the split mirror or double gradient effect, a protective shield 30 is placed in front of the lens along the horizontal axis. In FIG. 3, the shield 30 is shown to block the rising vaporized materials in order to yield the coating shown in FIG. 1.

Throughout the coating process, the pressure and temperature within the dome are constantly monitored to avoid excessive temperature and insufficient vacuum.

The vaporization source 26 is preferably an electric heating element which uses an electric current to heat the bigradient coating materials. Preferably, a separate cooling element is installed separate from the dome in order to ensure that the lenses do not exceed 50 degrees C.

The preferred materials, metal oxide chrome and $SiO_2$, are vaporized for approximately 30 minutes in the coating machine. It is specifically contemplated that the temperature be kept at a minimum and therefore a longer vaporization time then normally required helps keep temperatures down.

The cooling element can be any conventional means creating a heat exchange between the cooling element and the inner dome 28.

The anti-reflectant coating is preferably applied before implementing the bigradient coating process. However, the anti-reflectant coating may be applied after the cleaning process.

Preferably, the anti-reflectant coating is applied prior to the precutting of the lenses.

The invention, which is manifest in both a method of making a lens and in the lens itself, uses high quality ground mineral glass which is much more suitable than plastic lenses such as the polycarbonate lens employed by many sunglass lens manufacturers. While others have polarized polycarbonate lenses with a bigradient coating, the present invention represents the first glass lens polarized with a bigradient coating and an anti-reflectant coating.

The anti-reflectant coating may be applied using the same vacuum process in which the lenses are inverted and the shield 30 is removed so that an even coat on the inside of the lens is formed.

While the present invention has been described with reference to specific embodiments, it is understood that variations may be made without departing from what is contemplated as the invention.

We claim:

1. A sunglass lens comprising,
   two layers of ground mineral glass laminated together with a polarized film between the two glass layers, thereby forming a single lens having inner and outer surfaces,
   an anti-reflectant coating adhered to the inner surface of the lens, and
   a bigradient coating adhered to the outer surface of the lens on upper and lower portions thereof, wherein a horizontal axis of the lens is substantilly uncoated.

2. The lens of claim 1 wherein the bigradient coating is made of silicon dioxide.

3. The lens of claim 2 wherein the bigradient coating is made of metal oxide chrome.

4. A method of manufacturing a sunglass lens comprising,
   grinding and polishing two mounds of mineral glass,
   laminating the two mounds together with a polarization film disposed therebetween thereby forming a single glass lens having inner and outer surfaces,
   coating the inner surface of the lens with an anti-reflectant coating,
   cutting the lens to a desired precision fit, and
   coating the outer surface of the lens with a bigradient coating.

5. The method of claim 4 further comprising, cleaning the lens in an ultrasonic cleaning process prior to coating the outer surface with a bigradient coating.

6. The method of claim 5 wherein the cleaning step comprises, sequentially passing the lens through eight different tubs.

7. The method of claim 6 wherein the first two tubs contain a synthetic fluid kept at approximately 50 degrees C., the third tub contains regular tap water kept at approximately 19 degrees C., the fourth tub contains distilled water kept at approximately 19 degrees C., the fifth, sixth and seventh tubs contain isopropyl alcohol kept under 15 degrees C., and the eighth tub contains flon.

8. The method of claim 4 wherein the coating of the outer surface comprises, aligning horizontal axes of two such lenses (left and right) with aligning means, vaporizing bigradient coating material with vaporizing means, wherein the vaporizing means is disposed beneath the aligning means, blocking vaporized material along the horizontal axis of each lens, and cooling an area around the aligning means to prevent the temperature from exceeding 50 degrees C.

9. The method of claim 8 wherein the aligning means comprises an inner dome which carries at least one pair of said lenses, wherein the inner dome is provided with reference lines for forming right angles with the horizontal axis of each lens.

10. The method of claim 8 wherein the bigradient materials are vaporized in a vacuum vaporization dome having a pressure maintained at less than $6 \times 10^{-3}$ PA.

11. The method of claim 8 wherein the cooling means comprises a cooling element connected to the inner dome.

12. A lens which is a product of the method of claim 8.

13. A sunglass lens made by the method of manufacturing a sunglass lens comprising, grinding and polishing two mounds of mineral glass, laminating the two mounds together with a polarization film disposed therebetween thereby forming a single glass lens having inner and outer surfaces, coating the inner surface of the lens with an antireflectant coating, cutting the lens to a desired precision fit, and coating the outer surface of the lens with a bigradient coating.

14. The lens made by the method of claim 13 further comprising, cleaning the lens in an ultrasonic cleaning process prior to coating the outer surface with a bigradient coating.

15. The lens made by the method of claim 14 wherein the cleaning step comprises, sequentially passing the lens through eight different tubs.

16. The lens made by the method of claim 15 wherein the first two tubs contain a synthetic fluid kept at approximately 50 degrees C., the third tub contains regular tap water kept at approximately 19 degrees C., the fourth tub contains distilled water kept at approximately 19 degrees C., the fifth, sixth and seventh tubs contain isopropyl alcohol kept under 15 degrees C., and the eighth tub contains flon.

17. The lens made by the method of claim 13 wherein the coating of the outer surface comprises, aligning horizontal axes of two such lenses (left and right) with aligning means, vaporizing bigradient coating material with vaporizing means, wherein the vaporizing means is disposed beneath the aligning means, blocking vaporized material along the horizontal axis of each lens, and cooling an area around the aligning means to prevent the temperature from exceeding 50 degrees C.

18. The lens made by the method of claim 17 wherein the aligning means comprises an inner dome which carries at least one pair of said lenses, wherein the inner dome is provided with reference lines for forming right angles with the horizontal axis of each lens.

19. The lens made by the method of claim 17 wherein the bigradient materials are vaporized in a vacuum vaporization dome having a pressure maintained at less than $6 \times 10^{-3}$ PA.

20. The lens made by the method of claim 17 wherein the cooling means comprises a cooling element connected to the inner dome.

* * * * *